C. E. DELLENBARGER.
DISPLAY APPARATUS.
APPLICATION FILED SEPT. 15, 1917.
1,395,397.
Patented Nov. 1, 1921.
3 SHEETS—SHEET 1.
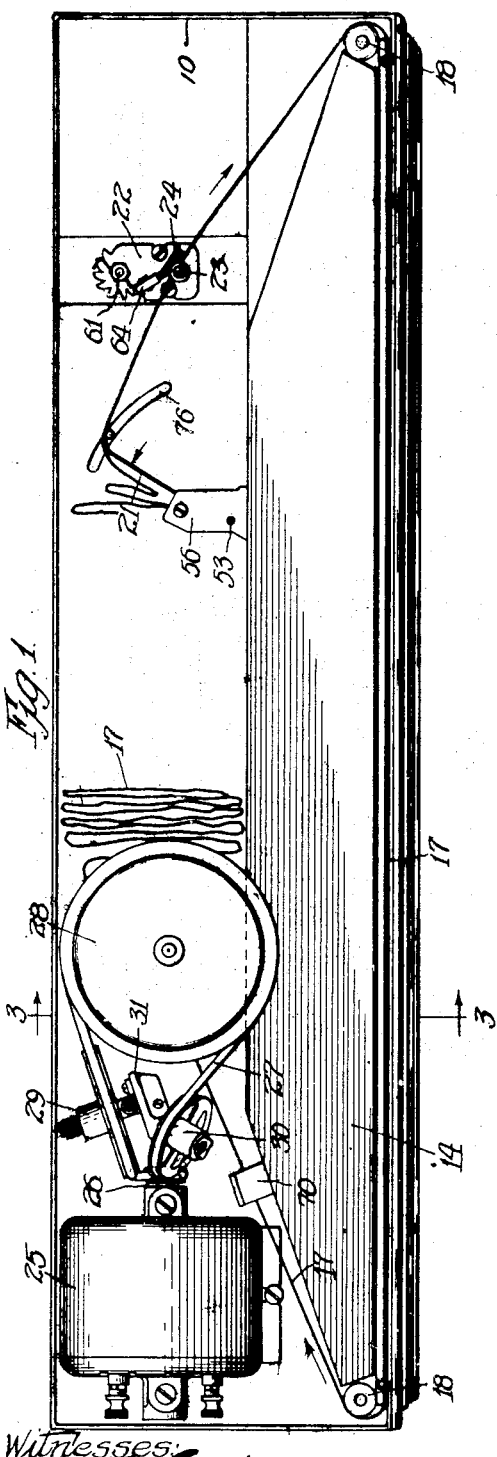
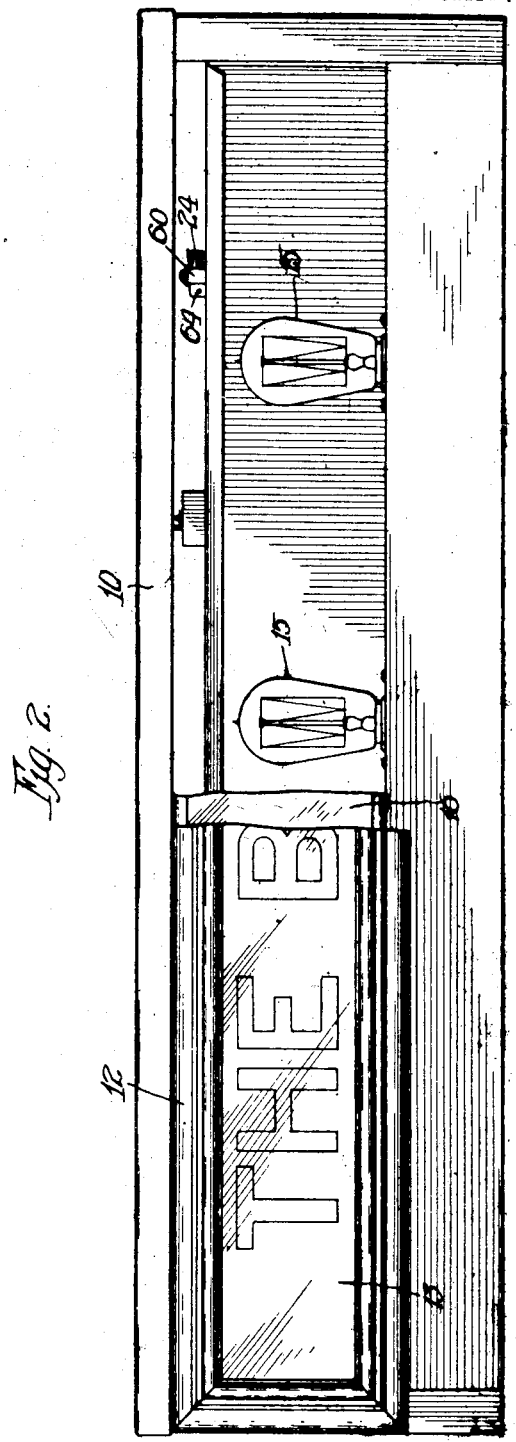

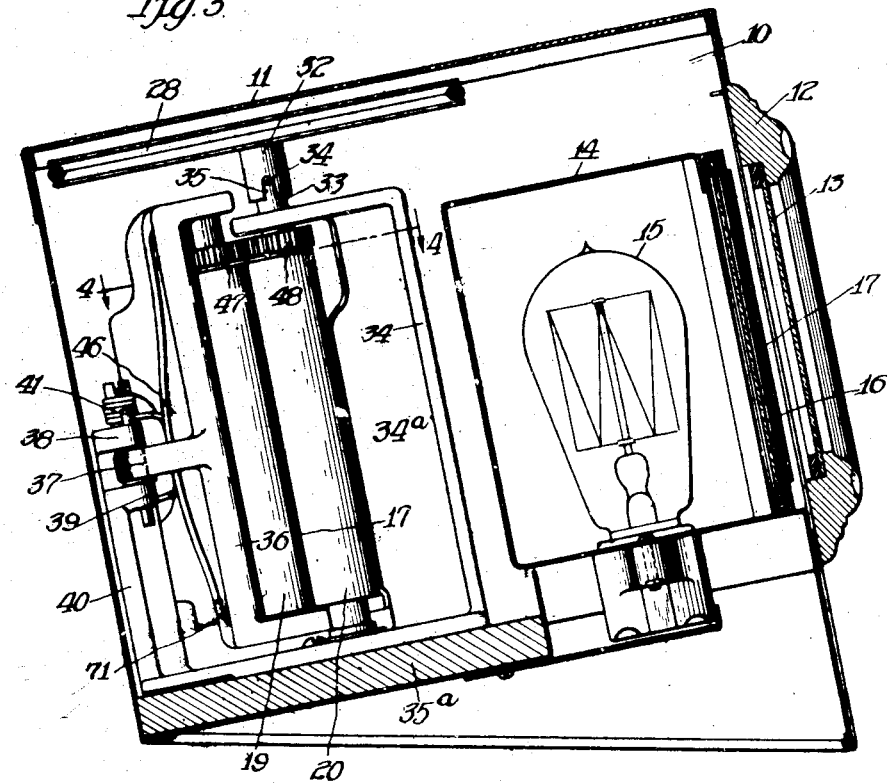
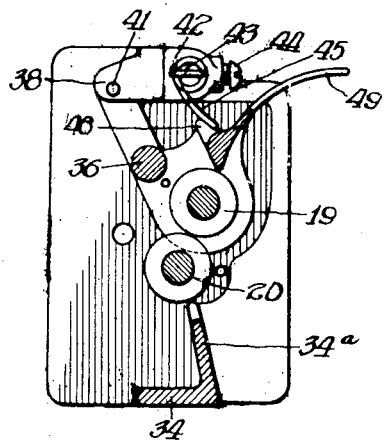

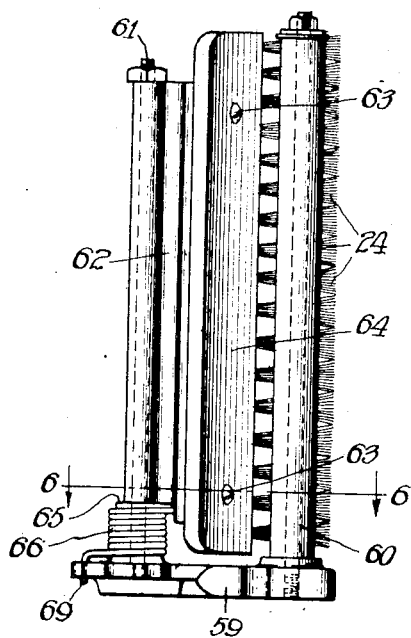
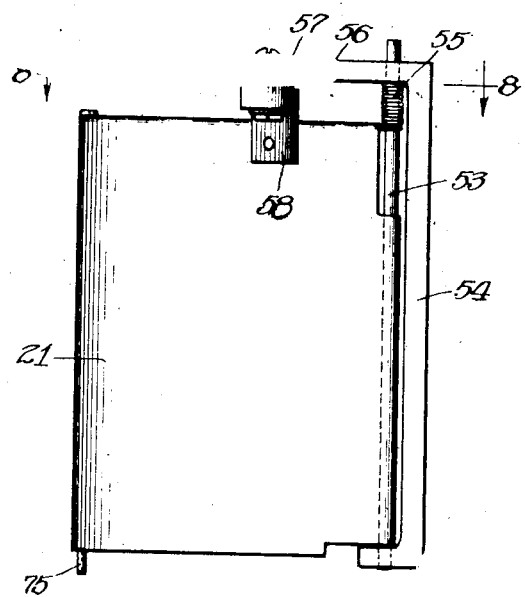
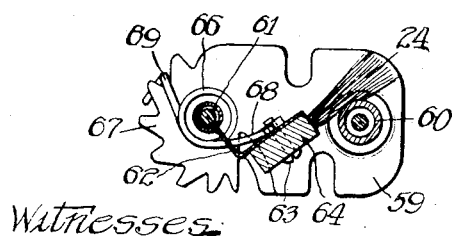
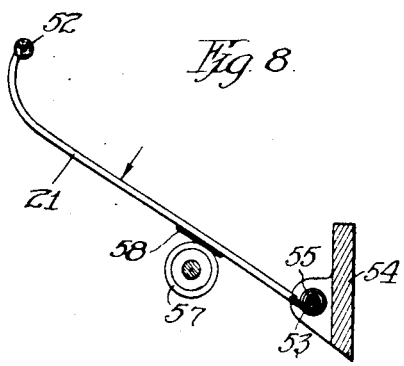

UNITED STATES PATENT OFFICE.

CHARLES E. DELLENBARGER, OF CHICAGO, ILLINOIS.

DISPLAY APPARATUS.

1,395,397. Specification of Letters Patent. Patented Nov. 1, 1921.

Application filed September 15, 1917. Serial No. 191,548.

*To all whom it may concern:*

Be it known that I, CHARLES E. DELLENBARGER, a citizen of the United States, and a resident of Chicago, in the county of Cook and State of Illinois, have invented certain new and useful Improvements in Display Apparatus, of which the following is a specification.

My present invention relates to improvements in display apparatus, more particularly such apparatus of the type in which an endless transparent or perforated strip is moved in front of a source of light in order to display a series of words, signs or the like.

The principal objects of my present invention are to provide improved means for passing a perforated strip or a transparency in front of a source of light; the provision of improved means for moving an endless strip of very considerable length across a source of light, while providing improved means for storing such part of the strip as is not being actually illuminated; the provision of improved means for keeping part only of the strip taut while allowing the remainder of the strip to accumulate in folds, thereby avoiding the use of an excessive number of guide rolls or other guiding means which are necessary when the entire strip is kept taut; to provide improved means for moving an endless strip; to provide an improved tensioning device for a moving strip or the like; to provide an improved form of double roller feed for the strip; to provide means for allowing for any inequalities in the thickness of the strip at different parts thereof, and generally to improve, simplify and cheapen the construction of display apparatus.

In attaining these and other objects and advantages, to be hereinafter set forth, I have provided a construction, one embodiment of which is illustrated in the accompanying drawings, in which:

Figure 1 is a plan view of the device with the cover removed to show the operating parts;

Fig. 2 is a front elevation of the device partly broken away;

Fig. 3 is a section on the line 3—3 of Fig. 1;

Fig. 4 is a section on the line 4—4 of Fig. 3;

Fig. 5 is a side view of the tensioning device;

Fig. 6 is a section on the line 6—6 of Fig. 5;

Fig. 7 is a side view of a guiding and restraining device for the strip; and

Fig. 8 is a section on the line 8—8 of Fig. 7.

In form of apparatus shown in the drawings 10 represents the box or outer casing provided with a cover or lid 11. The lower edge of the front wall of the casing extends below the lower edge of the rear wall to tilt the front of the device upwardly in order to display the sign better when the sign is resting on the floor of a shop window or the like.

Along the front of the apparatus is arranged the frame 12 carrying a glass strip or window 13. Inside the box 10 is arranged a second box 14, containing a series of incandescent lamps 15. Along the side adjacent to the window 13 in the outer box is arranged a glass strip or window 16 of frosted or translucent glass, adapted to diffuse the light from the lamps 15. Between the transparent glass window 13 and the translucent glass window 16 is drawn the endless perforated or transparent strip 17, so that it is illuminated from behind by the diffused light obtained through window 16 from the lamps 15, and is protected from the water, dust, dirt, etc., by means of window 13.

The mechanism for moving the strip 17 between the two glass windows will now be described.

At each end of the box 14 are arranged rollers 18, over which the strip may pass without obstruction or risk of cutting or tearing. To facilitate the passage of the strip the rear walls of the box 14 are arranged to converge at their ends toward the front wall of the apparatus. The strip is drawn in the direction of the arrows shown in Fig. 1, by means of a pair of power operated rolls 19 and 20 between which the strip passes. After leaving these rolls the strip 17 accumulates in a series of folds in the space at the rear of the box 14, as shown in Fig. 1. The strip is then drawn over a pivotally and resiliently mounted guide or restraining member 21, through a tensioning device 22 comprising a vertical rod or roller 23, against which a brush 24 is resiliently pressed. As every part of the brush is yieldable independently of all other parts, automatic compensation will thus be provided, for any inequalities, either in the thickness of parts of the strip or in the member 23. The brush pressing against the strip as it passes over the surface of the rod or roller 23 provides sufficient resistance to the passage of the strip to keep the strip in front of the lamps taut.

For driving the rollers 19 and 20 an electric motor 25 is provided, which may be operated from the same source of current which supplies the incandescent lamps. At the end of the shaft of this motor is a small pulley-wheel 26, around which a belt 27 runs. A horizontal pulley-wheel 28 is mounted on the shaft carrying the roller 20. The belt 27 is passed around this pulley, idle guide wheels 29 and 30 being provided for the purpose of producing the necessary change in direction of the belt. These idle wheels are mounted on a bracket 31 attached to the base of the apparatus.

The construction and arrangement of the roller feed device is an important feature of the present invention. The roller 20 is directly driven by the pulley-wheel 28, which is provided with a cylindrical hub 32 adapted to slide over the end 33 of the shaft which carries the roller 20. A pin 34 is arranged in the shaft 33 adapted to engage a slot 35 in this cylindrical portion. The pulley-wheel 28 may, therefore, be detached when desired by merely lifting it off the end of the shaft 33. The shaft 33 is journaled in a yoke 34 attached to a raised base portion 35ᵃ in the apparatus. The roller 19 is journaled in a yoke 36. This yoke, instead of being rigidly attached to the casing, is mounted so that it can turn in a plurality of directions. For this purpose the yoke 36 is provided with a centrally arranged lug or ear 37 arranged to extend between projections 38 and 39 on a bracket 40 forming an integral part of the yoke 34 which carries the roller 20. The projections 38 and 39 and the lug or ear 37 are connected by means of a pin 41, sufficient space being allowed between the pin 41 and the aperture in the lug 37 through which it passes, to allow the angle which the axis of the roller 19 makes with the vertical to be changed within small limits. The purpose of this will be described later.

The bracket 40 is provided with an extension 42 carrying a pin 43, secured in place by means of a set screw 44. Around each end of this pin 43 is arranged one end of a coiled spring 45. The ends of this spring are inserted in slots, as shown in Fig. 4, in the ends of the pin 43, and are thereby held from rotation. The mid-portion of the spring bears against the portion 46 of the yoke 36 which carries roller 19. The function of this spring is to press the roller 19 against the roller 20 so as to secure the necessary frictional engagement with the strip which passes between these two rollers.

As a result of the fact that the angular position of the axis of the roller 19 can change with respect to the vertical the roller 19 can adjust its position relatively to the roller 20 to allow for inequalities in the thickness of the strip. For instance, if the upper part of the strip should be slightly thicker than the lower part, the upper part of the roller 19 will move away from the roller 20, so that all parts of the strip will be subjected to substantially the same frictional force. This method of mounting the roller 19 also provides for inequalities in the rollers themselves, either due to faulty manufacture in the first instance, or uneven wearing of the rollers or the bearings to the shaft which carry the rollers.

While it might be sufficient to drive one of the rollers only and allow the other to turn as the result of frictional engagement with the moving strip, I prefer to drive both rollers positively from the source of power. For this purpose pinions 47 and 48 are mounted on the shafts which carry the rollers 19 and 20, respectively.

In order to be able to separate the rollers readily when desired, for instance, when a new endless strip 17 is to be inserted, which necessitates the separation of the rollers sufficiently far to bring the teeth of the pinions 47 and 48 out of engagement so that the strip may be slipped therebetween, I have provided a wing 49 on the yoke 36, which carries the roller 19.

This wing 49 also prevents the folds of the strip 17 getting behind the roller 19. To prevent the folds of the strip getting between the roller 20 and the rear of the box 14 the yoke 34 is provided with a web 34ᵃ, extending almost to the surface of the roller 20. The strip 17 is guided vertically in its passage to the rollers 19 and 20 by a projection 70 extending from the rear of the box 14 adapted to bear against the upper edge of the strip if the latter is displaced upwardly. The lower edge of the strip contacts with a raised portion 71 of the base, which carries the rollers 19 and 20. This raised portion is behind the rollers 19 and 20, as viewed in Fig. 3.

The guide or restraining member 21, shown more particularly in Figs. 7 and 8, consists of a plate with a curved edge ending in a cylindrical bead 52, which allows the strip to pass smoothly past the member. Within this cylindrical bead is arranged a rod, the lower end 75 of which projects below the lower edge of the member 21 into a slot 76 arranged in the base of the apparatus. This rod engaging in the slot 76 limits the extent of movement of the member 21. A more important function, however, is to prevent fallen folds of the strip getting underneath the member 75 and becoming torn, folded or twisted. After considerable use the strips used become soft and flabby and might readily become caught in this way if the rod 75 were not employed.

The opposite edge of the member 21 is curved into cylindrical form for engagement with a rod 53, which acts as a pivot for the part 21. This rod 53 is mounted in a yoke 54 attached to the bottom of the casing. Around the upper part of this rod is arranged a coil spring 55, having one end bearing against the yoke 54, and its other end pressing against the member 21 so as to tend to move the latter in the direction of the arrow shown in Figs. 1 and 8. The yoke 54 is provided with an extension 56 at its upper part which carries a rubber cushion 57 adapted to engage the upper end of a plate 58 attached to the member 21. This cushion 57 and plate 58 limit the movement of the plate 21 under the action of the spring 55.

One function of this member 21 is to straighten out the folds of the strip before it reaches the tension device and thus prevent possible obstruction of the action of the latter or the tearing of the strip. It acts with yielding pressure on the folds and equalizes and controls the straightening out of the folds prior to the passage of the strip between the parts of the tension device. Another function is to hold the folds in a vertical position in the space between the member 21 and the rollers 19 and 20.

The tension device is shown more particularly in Figs. 5 and 6. On a base portion 59 is rigidly attached a rod or roller 60 and a second rod 61. On this rod 61 is pivotally mounted a bracket 62 to which is attached, by means of bolts 63, a brush 64. Surrounding the projections 65 which carries the lower end of the rod 61 is a coil spring 66, having one end 69 in engagement with one or other of the projections 67 on the base 59 of the device. The other end 68 of this spring presses against the bracket, which carries the brush, and thereby holds the bristles of the brush in yielding contact with the rod or roller 60. The flexible strip is passed between the rod or roller 60 and the bristles of the brush. The frictional force which the brush exerts on the strip, by reason of the spring 66, may be varied by adjusting the position of the end 69 of the spring with a relation to the series of projections 67 on the base of the device.

Having thus described my invention and illustrated its use, what I claim as new and desire to secure by Letters Patent is:—

1. A device of the kind set forth, comprising in combination, an endless strip, means for illuminating a portion of said strip, means for drawing said strip past said illuminating means, including a pair of coöperating rollers, and a friction device acting on the strip at a point substantially in advance of the portion being illuminated, whereby said strip is held taut while passing said means.

2. A device for moving a strip of material, comprising in combination, a roller, means for rotating said roller, a second roller adapted to coöperate with said first mentioned roller, resilient means for pressing said rollers together, and a pivoted roller-support for allowing one of said rollers to change the angle of its axis relative to the axis of the other roller and thereby provide for differences in thickness of material adjacent one edge, as compared with the material adjacent the other edge.

3. A tensioning device for flexible strips, comprising in combination, a fixed member and a flexible brush yieldingly pressed against said member adapted to frictionally engage a strip passing between said member and said brush.

4. A tensioning device for flexible strips, comprising in combination, a fixed member and yielding means slidably supported intermediate its ends and adapted to press against said member and frictionally engage a strip passing between said member and said means, one part of said yielding means being movable independently of another part, and thereby providing for differences in thickness of material at different parts thereof.

5. A device for moving a strip of material, comprising in combination, a pair of coöperating rollers, means for positively rotating both rollers simultanenously, resilient means for pressing said rollers together, and means for allowing one of said rollers to change the angle of its axis relative to the axis of the other roller, and thereby provide for differences in thickness of material adjacent one edge as compared with the material adjacent the other edge.

6. A device for moving a strip of material, comprising in combination, a roller, means for rotating said roller, a second roller adapted to coöperate with said first mentioned roller, a gear connection between said rollers, and means for allowing one of said rollers to change the angle of its axis relative to the axis of the other roller, and thereby provide for differences in thickness of material adjacent one edge as compared with the material adjacent the other edge.

7. In a device of the character described, in combination, an endless transparency, means for maintaining the illuminated part of the transparency vertical and taut with the edges thereof one above the other, said means moving said transparency horizontally to bring another part into position for illumination and to accumulate a part of the transparency not illuminated in folds in preparatory position for further illumination.

8. A device for moving an endless strip of material, including a rotating member adapted to move a portion of the strip and a pivotally mounted member adapted to hold the folds of said strip edgewise in a vertical position preparatory to movement by said rotating member.

9. A device for moving an endless strip of material, including a casing, a rotating member adapted to move a portion of the strip, a member pivotally mounted on said casing adapted to hold the folds of said strip in a vertical position preparatory to movement by said rotating member, and a projection from the lower free edge of said member adapted to extend into a slot in the base of said casing and thereby prevent portions of the strip entering the space between the lower edge of said strip and the said base.

10. A device of the kind set forth, comprising in combination, an endless strip, means for illuminating a portion of said strip, means for drawing said strip past said illuminating means, including a pair of coöperating rollers adjacent one end of said means, and a yieldingly resistant means acting on said strip at a point in advance of the portion being illuminated, whereby said strip is held taut while passing said illuminating means.

11. A tensioning device for flexible strips, comprising in combination, a fixed member and a brush yieldingly pressed against said member adapted to frictionally engage a strip passing between said member and said brush.

12. A device for moving an endless strip of material, including a rotating member adapted to move a portion of the strip and a pivotally mounted member adapted to sustain the folds of said strip edgewise in a predetermined position preparatory to movement by said rotating member.

In testimony whereof, I have hereunto signed my name in the presence of the two subscribed witnesses.

CHARLES E. DELLENBARGER.

Witnesses:
MAX HEYMANN,
GUS HEYMANN.